Patented Oct. 28, 1952

2,615,854

UNITED STATES PATENT OFFICE 2,615,854

PRINTING INK CONTAINING A TERPENE MODIFIED PHENOL FORMALDEHYDE RESIN

John Pantin, Chicago, and Gordon R. MacQuaker, Wheaton, Ill., assignors to Sun Chemical Corporation, Long Island City, N. Y., a corporation of Delaware No Drawing. Application September 9, 1949, Serial No. 114,918

9 Claims. (Cl. 260—25)

1

The present invention relates to printing inks and, more particularly, to printing inks employing high boiling solvents as the liquid medium thereof and adapted for quick drying of the imprinted ink film by application of heat.

An object of the present invention is to provide printing inks employing high boiling solvents as the liquid medium thereof, which upon being printed as a film and subjected to high temperature drying conditions, furnish highly glossy prints.

Another object of the present invention is to provide printing inks containing gel-like compositions, which compositions are substantially heat stable.

Another object of the present invention is to provide printing inks characterized by the resistance of imprinted films of such inks to paper penetration under the influence of high temperature conditions.

Other objects of the present invention will be apparent from the following description and appended claims.

Among the various methods commonly employed for effecting quick drying of inks, one of the most common is by the rapid evaporation of the liquid solvents from the ink film after printing. Such quick drying of an imprinted ink may be had by the use, as the liquid medium thereof, of highly volatile solvents which evaporate almost instantly upon application of the ink as a thin film upon a suitable surface. Where high boiling solvents are employed as the liquid medium of printing inks, rapid drying of the imprinted ink film is accomplished by the application of sufficient heating to the imprinted surface to effect almost instantaneous evaporation of the solvent contained in the imprinted ink film without burning or otherwise adversely affecting the imprinted material.

Printing inks containing such high boiling solvents as the liquid medium thereof have obtained widespread use in high speed typographic printing, particularly in the field of magazine printing where sharpness and clarity of reproduction are essential. Such characteristics are obtainable with inks of this type due to the high press stability of these inks, such characteristic permitting the use of large ink distributing systems which distribute the ink evenly, smoothly and uniformly on its way from the ink fountain, or reservoir, to the printing plate, thus insuring the application of a controlled and uniformly thick ink film upon the surface to be printed. In order to effect rapid drying of the imprinted

2 ink film, the imprinted surface or material such as, for example, the paper web employed in continuous rotary printing operations, is led into contact with some suitable heating means which instantly vaporizes the liquid solvent contained in the imprinted ink film, drying the said film and permitting the imprinted web to be immediately rewound, or to be passed to a second printing unit for reverse side printing without danger of offset. Such heating means may consist of heated rollers over which the web rides after printing, or it may consist of a chamber wherein a series of gas flames, or the heat generated by the same, are directed upon the surface of the rapidly moving web, or it may consist of any other heat furnishing means capable of instantly vaporizing the solvent in the ink film without adversely affecting the imprinted surface. One great disadvantage of the method of quick drying inks as outlined above lies in the fact that upon subjecting the imprinted surface to a heat which is sufficiently intense as to effect immediate evaporation of the solvent contained in the ink film and effect drying of the ink film thereby, a print is obtained which is very much lacking in gloss, a property highly desired in ordinary magazine printing. Exactly why it is that the application of heat seems to deaden the apparent gloss of the ink film is not known with certainty. It may be that the intense heat causes the ink film to penetrate into the paper to such an extent that any gloss which ordinarily might have been obtained is lost. Or it may be that too great a penetration of the paper by the freshly imprinted film occurs between printing and drying to leave a sufficient amount of ink upon the paper surface to withstand the gloss-killing action of the heat.

It has been thought that if some system were devised whereby the extent of the paper penetration of the imprinted ink film could be reduced in that interval after printing and before application of heat thereto, the imprinted ink film would remain on the surface of the paper during the drying operation and therefore retain much of the apparent gloss of the ink. To this end, there have been incorporated into such inks various materials and compositions, which it was hoped, would withstand the action of the heat and thus resist destruction of the gloss of the print, either by preventing excessive paper penetration by the ink film under the action of the heat or by retaining the ink film in such condition as to maintain the natural gloss characteristics of the ink. Among the various materials which have been employed in an attempt to correct the condition above mentioned, were various thickening compositions which generally had the effect of increasing the body of the ink and rendering the ink less fluid, and which it was hoped would give the ink film a greater degree of cohesion to offset the adverse effect of the heat. However, those compositions which have hitherto generally been employed have had no appreciable effect in resisting the action of the heat insofar as the gloss of the finished print was concerned. Whatever the action of the heat upon the imprinted ink film may have been, a print was usually obtained which was extremely lifeless, flat, and lacking in gloss.

We have found, according to the present invention, that printing inks containing high boiling solvents as the liquid medium thereof can be prepared which, upon being imprinted as a film which is subsequently subjected to rapid heat drying conditions while still in a wet or unset condition, furnish prints which exhibit a gloss at least equal to that obtained when the ink film is allowed to dry under normal air drying conditions.

The printing inks of the present invention comprise a vehicle in which high boiling aliphatic hydrocarbon solvents constitute the liquid medium thereof and wherein a resinous material which is soluble in the said solvents constitutes the binder material thereof, and in which there is included a gel-like composition consisting of a high boiling aliphatic hydrocarbon solvent, a high boiling aliphatic hydrocarbon solvent soluble terpene-modified phenol-formaldehyde resin and aluminum octoate, the latter material being present in such proportion as to provide a substantially stable gel-like composition.

The aliphatic hydrocarbon solvents employed in the inks of the present invention are those which are generally obtained from petroleum sources and may satisfactorily constitute any of the higher boiling fractions thereof. The resinous binder of these inks may be any of those resins which are soluble in the said aliphatic hydrocarbon solvents and which are commonly employed in inks of the heat drying type. It is understood that any of the coloring materials commonly utilized in printing inks may satisfactorily be incorporated in the inks of the present invention.

The gel-like compositions which comprise an essential part of the inks of the present invention contain a solvent which is of the same type and character as the solvent employed as the liquid medium of the said inks. The particular resin employed in conjunction with aluminum octoate to provide the gel-like compositions is an isomerized terpene-modified phenol-formaldehyde oil-soluble and aliphatic hydrocarbon solvent-soluble thermoplastic resin, manufactured and sold by Durez Plastics and Chemicals Inc. under the name "Durez 220." The said resin has a melting point of approximately 286° F. ± 5° F., an acid number of 17 to 22 and a specific gravity at 25° C. of 1.09.

In preparing the gel-like compositions of the present invention, or the heat dry compounds as these compositions will hereinafter be termed, a varnish or vehicle is prepared by forming a solution of approximately 30-60 parts of the above described resin in approximately 70-40 parts of a high boiling aliphatic hydrocarbon solvent of the type previously set forth, at a temperature sufficient to effect such solution. A slurry is then prepared by incorporating into a small portion, for example, 15%, of the above varnish an amount of aluminum octoate corresponding to between approximately 2% and 4% by weight of the total varnish. The slurry thus formed is added to the remainder of the varnish at a temperature of approximately 150° F. and the temperature of the varnish is thereupon gradually raised to approximately 215° F. under agitation conditions and maintained thereat until a composition having somewhat of a gel-like consistency has been obtained. Agitation and heating of the above materials may satisfactorily be accomplished in a suitable mixing machine, such as a steam jacketed dough mixer, or similar mixing device.

Illustrative of heat drying compounds prepared according to the above outlined process are the compositions corresponding to the following formulas.

| | Parts by weight |
|---|---|
| Heat dry compound #1: | |
| Aliphatic hydrocarbon solvent (boiling range 280° C.-290° C.) | 48.65 |
| Terpene - modified phenol-formaldehyde resin | 48.65 |
| Aluminum octoate | 2.7 |
| | 100.00 |
| Heat dry compound #2: | |
| Aliphatic hydrocarbon solvent (boiling range 280° C.-290° C.) | 48.0 |
| Terpene - modified phenol - formaldehyde resin | 48.0 |
| Aluminum octoate | 4.0 |
| | 100.0 |
| Heat dry compound #3: | |
| Aliphatic hydrocarbon solvent (boiling range 300° C.-310° C.) | 58.5 |
| Terpene - modified phenol - formaldehyde resin | 39.0 |
| Aluminum octoate | 2.5 |
| | 100.0 |
| Heat dry compound #4: | |
| Aliphatic hydrocarbon solvent (boiling range 250° C.-260° C.) | 43.0 |
| Terpene - modified phenol - formaldehyde resin | 53.5 |
| Aluminum octoate | 3.5 |
| | 100.0 |

The printing inks of the present invention may be prepared by any of the methods commonly utilized in the printing ink industry. For example, a vehicle may be prepared by effecting solution of a resin in a high boiling aliphatic hydrocarbon solvent and the dry pigment may then be incorporated therein by the usual methods of mixing and milling, such as by the use of the well known three-roll mill or by means of a ball mill. If it is desired to employ the pigment in the pulp state, such as the press cake obtained in the manufacture of lake colors, the pigment may be flushed into the ink vehicle to obtain dispersion of the same therein. Satisfactorily, the heat dry compound may then be incorporated into the pigmented vehicle thus prepared by mixing the heat dry compound therewith until a smooth, homogeneous composition has been obtained. If desired, the heat dry compound may first be incorporated in the ink vehicle and the pigment added later with milling, but such procedure is not preferred. To obtain the most satisfactory results with the inks of the present invention, the amount of heat dry compound incorporated into the ink compositions of the present invention should be within the range of approximately 40%–60% by weight based upon the weight of the ink vehicle. Since the ink vehicles of the inks of the present invention usually constitute from approximately 70% by weight to approximately 90% by weight of the said inks, although such a range should not necessarily be considered as limiting, the amount of heat dry compound which may generally be incorporated into the inks of the present invention may vary between the ranges of approximately 28% by weight and approximately 56% by weight based upon the total weight of the ink.

The following ink compositions are illustrative of successful commercial inks prepared according to the present invention.

Example I:

| | Parts by weight |
|---|---|
| Benzidine yellow pigment | 12.6 |
| Zinc resinate | 24.5 |
| Aliphatic hydrocarbon solvent (boiling range 301° C.–310° C.) | 20.0 |
| Heat dry compound #1 | 42.9 |
| | 100.0 |

Example II:

| | |
|---|---|
| Phloxine red pigment | 15.7 |
| Calcium resinated lithol red pigment | 3.2 |
| Pentaerythritol-abietic acid resin | 12.9 |
| Zinc resinate | 8.5 |
| Aliphatic hydrocarbon solvent (boiling range 280° C.–290° C.) | 20.5 |
| Heat dry compound #2 | 39.2 |
| | 100.0 |

Example III:

| | |
|---|---|
| Peacock blue pigment | 26.10 |
| Pentaerythritol-abietic acid resin | 14.33 |
| Aliphatic hydrocarbon solvent (boiling range 280° C.–290° C.) | 11.72 |
| Aliphatic hydrocarbon solvent (boiling range 250° C.–260° C.) | 8.25 |
| Heat dry compound #3 | 39.6 |
| | 100.00 |

Example IV:

| | |
|---|---|
| Carbon black pigment | 14.8 |
| Alkali blue pigment | 2.1 |
| Zinc resinate | 19.7 |
| Pentaerythritol-abietic acid resin | 1.3 |
| Aliphatic hydrocarbon solvent (boiling range 280° C.–290° C.) | 14.9 |
| Aliphatic hydrocarbon solvent (boiling range 240° C.–260° C.) | 12.7 |
| Heat dry compound #4 | 34.5 |
| | 100.0 |
| Carbon black pigment | 12.5 |
| Alkali blue pigment | 2.0 |
| Calcium resinate | 14.0 |
| Aliphatic hydrocarbon solvent (boiling range 280° C.–290° C.) | 20.2 |
| Heat dry compound #1 | 51.3 |
| | 100.0 |

Prints made by imprinting the printing ink of the present invention as a film upon a paper surface which is then immediately subjected to the usual heat drying operations exhibit a high gloss and smooth finish. There is no apparent deterioration of the ink film under such heating conditions as is usually had with the commonly employed heat-set inks. Exactly why such desirable results are obtained by the employment of the gel-like compositions set forth above, is not known with certainty but it is evident that such compositions are substantially stable under the intense temperatures employed in the heat drying operations to the extent of preventing deterioration of the ink film upon the immediate evaporation of the solvent contained therein, or at least to the extent of arresting paper penetration by the imprinted ink film due to the heat drying. Furthermore, the trapping qualities of the inks of the present invention, that is, the ability to print successive colors one upon the other while the previously imprinted ink film is still in an unset condition, are greatly superior to those of conventional heat dry inks. This is due to the fact that printing inks containing the heat dry compounds of the present invention are generally more stable toward the heat generated by the printing press during the printing operation, preventing any appreciable change in the character of the ink during the printing operation such as a possible softening of the body of the ink, or change in the viscosity or in the tack characteristic of the original ink.

Nor is it known what properties are imparted to the gel-like compositions by the employment of a terpene-modified phenol-formaldehyde resin and aluminum octoate in the preparation of the said compositions which provide such desirable characteristics to the inks of the present invention, for other gel-like compositions have been employed in heat-set printing inks without obtaining such results. Nor has the incorporation into heat-set inks of gel-like compositions employing other aluminum salts as the gelling agent of the said compositions, such as the aluminum salts of the higher fatty acids, provided adequate protection against deterioration of the imprinted ink film under high temperature conditions. Whatever the reason for the effect of the heat dry compounds upon the printing inks of the present invention may be, it has been found that a composition prepared according to the present invention, employing a terpene-modified phenol-formaldehyde resin, a high boiling aliphatic hydrocarbon solvent, and aluminum octoate in the proportions as heretofore set out, and which composition possesses gel-like characteristics, when incorporated into a printing ink or printing ink vehicle such as are set forth hereinbefore will impart to the completed ink the characteristics of lessened paper penetration of the imprinted ink film and a greater gloss and finish to the said ink film after evaporation of the solvent therefrom by heating.

While the above products and processes of preparing the same constitute preferred embodiments of the present invention, changes may be made therein without departing from the scope of the invention as defined in the appended claims.

What is claimed is:

1. A vehicle for a printing ink comprising zinc resinate and a high boiling aliphatic hydrocarbon solvent therefor, said solvent having a boiling point not lower than approximately 240° C., and including from about 40% by weight to about 60% by weight based upon the weight of the said vehicle of a gel-like composition consisting of a high boiling aliphatic hydrocarbon solvent soluble terpene-modified phenol-formaldehyde resin, a high boiling aliphatic hydrocarbon solvent having a boiling point not lower than approximately 240° C., and approximately 2% to 4% by weight based upon the weight of the said composition of aluminum octoate.

2. A vehicle for a printing ink comprising a pentaerythritol-abietic acid resin and a high boiling aliphatic hydrocarbon solvent therefor, said solvent having a boiling point not lower than approximately 240° C., and including from about 40% by weight to about 60% by weight based upon the weight of the said vehicle of a gel-like composition consisting of a high boiling aliphatic hydrocarbon solvent soluble terpene-modified phenol-formaldehyde resin, a high boiling aliphatic hydrocarbon solvent having a boiling point not lower than approximately 240° C., and approximately 2% to 4% by weight based upon the weight of the said composition of aluminum octoate.

3. A vehicle for a printing ink comprising calcium resinate and a high boiling aliphatic hydrocarbon solvent therefor, said solvent having a boiling point not lower than approximately 240° C., and including from about 40% by weight to about 60% by weight based upon the weight of the said vehicle of a gel-like composition consisting of a high boiling aliphatic hydrocarbon solvent soluble terpene-modified phenol-formaldehyde resin, a high boiling aliphatic hydrocarbon solvent having a boiling point not lower than approximately 240° C., and approximately 2% to 4% by weight based upon the weight of the said composition of aluminum octoate.

4. A printing ink comprising coloring material dispersed in a vehicle comprising zinc resinate and a high boiling aliphatic hydrocarbon solvent therefor, said solvent having a boiling point not lower than approximately 240° C., and including from approximately 28% by weight to about 56% by weight based upon the weight of the ink of a gel-like composition consisting of a high boiling aliphatic hydrocarbon solvent soluble terpene-modified phenol-formaldehyde resin, a high boiling aliphatic hydrocarbon solvent having a boiling point not lower than approximately 240° C., and approximately 2% to 4% by weight based upon the weight of the said composition of aluminum octoate.

5. A printing ink comprising coloring material dispersed in a vehicle comprising pentaerythritol-abietic acid resin and a high boiling aliphatic hydrocarbon solvent therefor, said solvent having a boiling point not lower than approximately 240° C., and including from approximately 28% by weight to about 56% by weight based upon the weight of the ink of a gel-like composition consisting of a high boiling aliphatic hydrocarbon solvent soluble terpene-modified phenol-formaldehyde resin, a high boiling aliphatic hydrocarbon solvent having a boiling point not lower than approximately 240° C., and approximately 2% to 4% by weight based upon the weight of the said composition of aluminum octoate.

6. A printing ink comprising coloring material dispersed in a vehicle comprising calcium resinate and a high boiling aliphatic hydrocarbon solvent therefor, said solvent having a boiling point not lower than approximately 240° C., and including from approximately 28% by weight to about 56% by weight based upon the weight of the ink of a gel-like composition consisting of a high boiling aliphatic hydrocarbon solvent soluble terpene-modified phenol-formaldehyde resin, a high boiling aliphatic hydrocarbon solvent having a boiling point not lower than approximately 240° C., and approximately 2% to 4% by weight based upon the weight of the said composition of aluminum octoate.

7. A substantially heat stable gel-like composition consisting of from approximately 30 to 60 parts by weight of a terpene-modified phenol-formaldehyde resin, 70 to 40 parts by weight of high boiling aliphatic hydrocarbon solvent having a boiling point not lower than approximately 240° C., and between approximately 2% to 4% by weight of the said composition of aluminum octoate.

8. A vehicle for a printing ink comprising a resinous binder selected from the group consisting of metallic resinates and rosin esters, and a high boiling aliphatic hydrocarbon solvent therefor, said solvent having a boiling point not lower than approximately 240° C., and including from about 40% by weight to about 60% by weight based upon the weight of the said vehicle of a gel-like composition consisting of a high boiling aliphatic hydrocarbon solvent-soluble terpene-modified phenol-formaldehyde resin, a high boiling aliphatic hydrocarbon solvent having a boiling point not lower than approximately 240° C., and approximately 2% to 4% by weight of the said composition of aluminum octoate.

9. A printing ink comprising coloring material dispersed in a vehicle comprising a resinous binder selected from the group consisting of metallic resinates and rosin esters, and a high boiling aliphatic hydrocarbon solvent therefor, said solvent having a boiling point not lower than approximately 240° C., and including from approximately 28% by weight to about 56% by weight based upon the weight of the ink of a gel-like composition consisting of a high boiling aliphatic hydrocarbon solvent-soluble terpene-modified phenol-formaldehyde resin, a high boiling aliphatic hydrocarbon solvent having a boiling point not lower than approximately 240° C. and approximately 2% to 4% by weight based upon the weight of the said composition of aluminum octoate.

JOHN PANTIN.
GORDON R. MacQUAKER.

No references cited.